July 17, 1962   L. C. PATTERSON   3,044,351
PHOTOGRAPHIC APPARATUS
Filed Jan. 26, 1956   5 Sheets-Sheet 1

INVENTOR.
Lionel C. Patterson
BY
ATTORNEY

July 17, 1962 L. C. PATTERSON 3,044,351
PHOTOGRAPHIC APPARATUS
Filed Jan. 26, 1956 5 Sheets-Sheet 2

INVENTOR.
BY Lionel C. Patterson
ATTORNEY

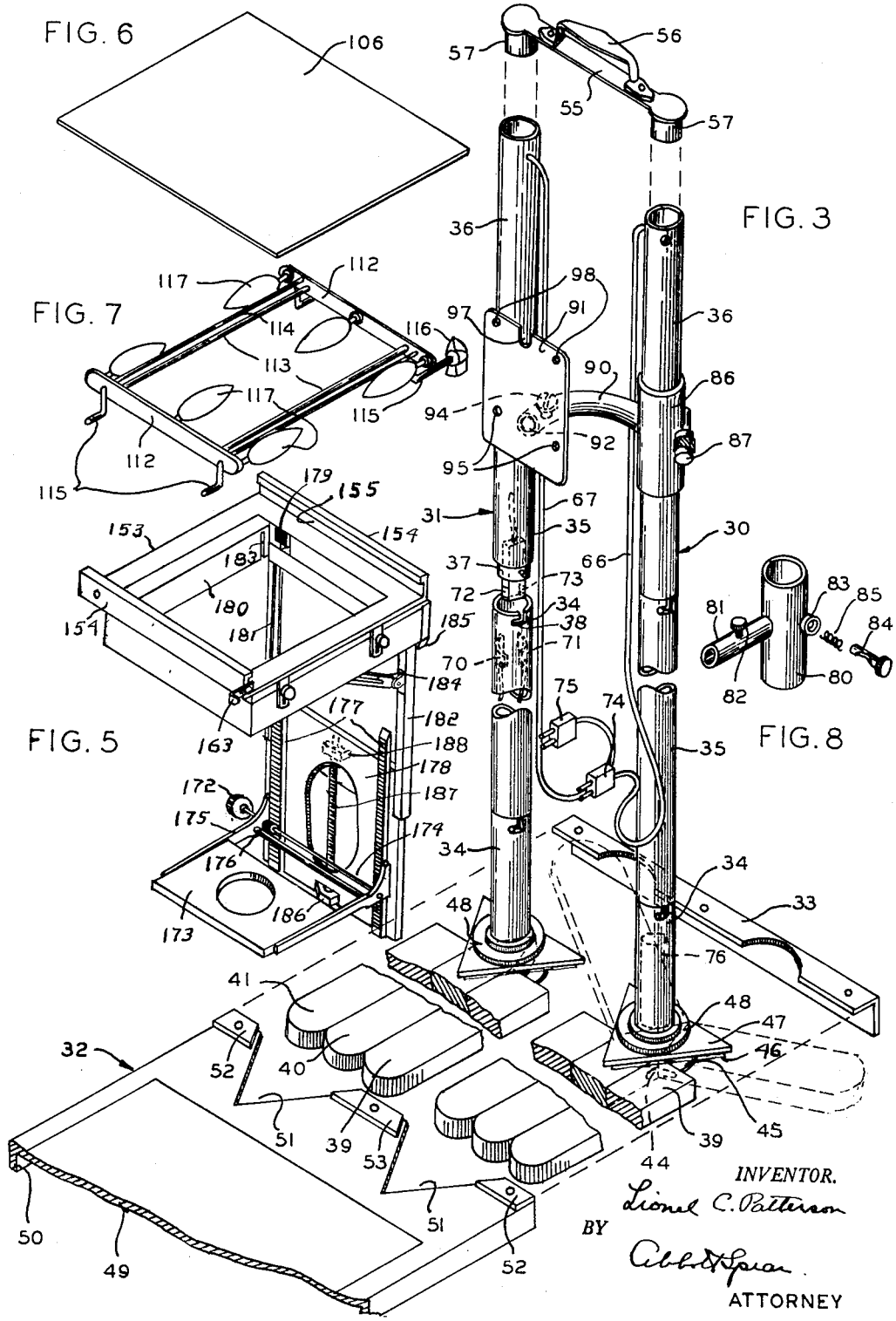

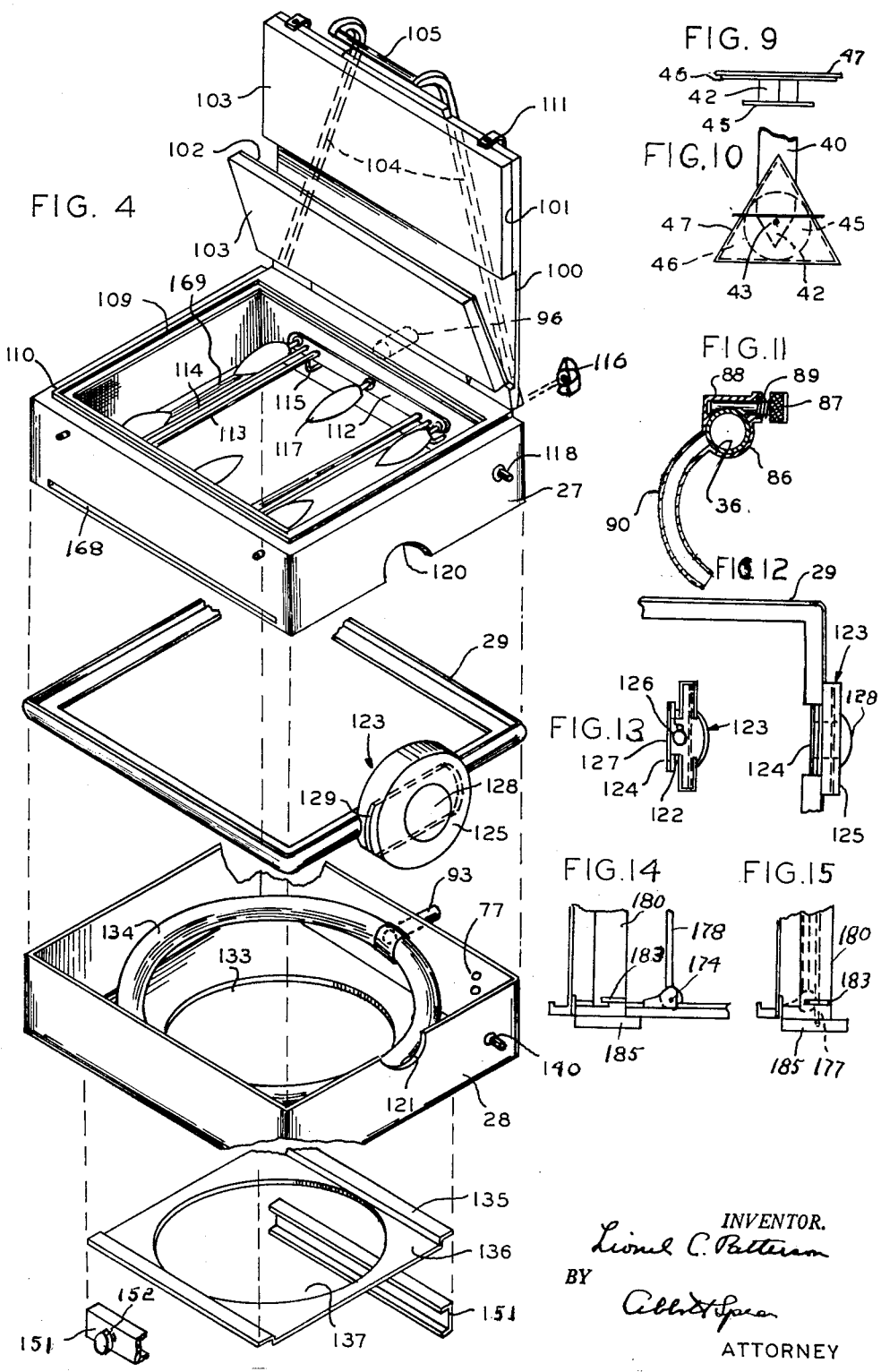

July 17, 1962 — L. C. PATTERSON — 3,044,351
PHOTOGRAPHIC APPARATUS
Filed Jan. 26, 1956 — 5 Sheets-Sheet 5

INVENTOR.
Lionel C. Patterson
BY
Abbott Spear
ATTORNEY

United States Patent Office 3,044,351
Patented July 17, 1962

3,044,351
PHOTOGRAPHIC APPARATUS
Lionel C. Patterson, 4 Sharia Silahder, Heliopolis, Egypt
Filed Jan. 26, 1956, Ser. No. 561,697
13 Claims. (Cl. 88—24)

This invention relates to photographic apparatus combining the essential components for both dark room and studio operations.

The cost of necessary dark room and studio equipment has long been thought to be the principal deterrent to the extension, by many amateur photographers, of their activities in those directions. Attempts to meet the requirements of this large group with less costly equipment than that intended for professional photographers and proposals for multi-use units offering, in addition to cost advantage, compactness in use and storage, have not met the demand and have demonstrated that quality of work and ease and convenience in use are considerations of primary importance.

The principal objective of this invention is to provide unitary apparatus that enables such dark room operations as enlarging, reducing, copying with and without film, and contact printing to be performed efficiently and accurately while enabling the apparatus to be quickly and easily converted, for studio uses, into a camera with suitable reflectors.

This generally stated objective is attained by providing a camera and first and second reflectors each having a light source and detachably joined together to provide a light-tight housing to which the camera is detachably secured so that its interior may be illuminated by the light source of either reflector. The first reflector has a film-receiving means located on one side of its light source and a copy board on the other, and the second reflector has a camera and shutter supporting means.

When the camera and reflectors are assembled as a unit and mounted as on a standard, such dark room operations as enlarging and reducing, copying, projecting, and contact printing may be performed therewith. When the unit is disassembled, the camera may be used by itself and the reflectors used to assist in its studio uses. The invention provides two standards unified by a false base usable in certain dark room operations, there being one standard for each reflector and with one holding the assembled unit for dark room uses.

Other objectives of the invention are concerned with the adaptation of the various parts for most effective use with other parts and to ensure maximum ease and convenience in assembling and disassembling of the apparatus.

In the accompanying drawings there is shown an illustrative embodiment of the invention from which these and other of its objectives, novel features, and advantages will be readily apparent.

In the drawings:

FIG. 3 is a perspective view of the standards with the false base removed.

FIG. 4 is an exploded perspective view showing the parts of the housing that are detachably carried by the standards and to which the camera is detachably secured.

FIG. 5 is a perspective view of the camera chassis.

FIGS. 6 and 7 are like views, respectively, of the opal contact printer glass and the opal light source used in enlarging and reducing and their frame.

FIG. 8 is a partly sectioned view of a clamp, adjustably carried by one of the standards.

FIGS. 9 and 10 are rear end and top plan views, respectively, of a leg of a standard.

FIG. 11 is a cross section view of a clamp adjustably carried by one of the standards.

FIG. 12 is a fragmentary plan view of the frame between the reflector parts and the safelight carried thereby.

FIG. 13 is a partly sectioned view of the safelight.

FIGS. 14 and 15 are views illustrating two positions of the bellows adjusting racks.

Figure 1:
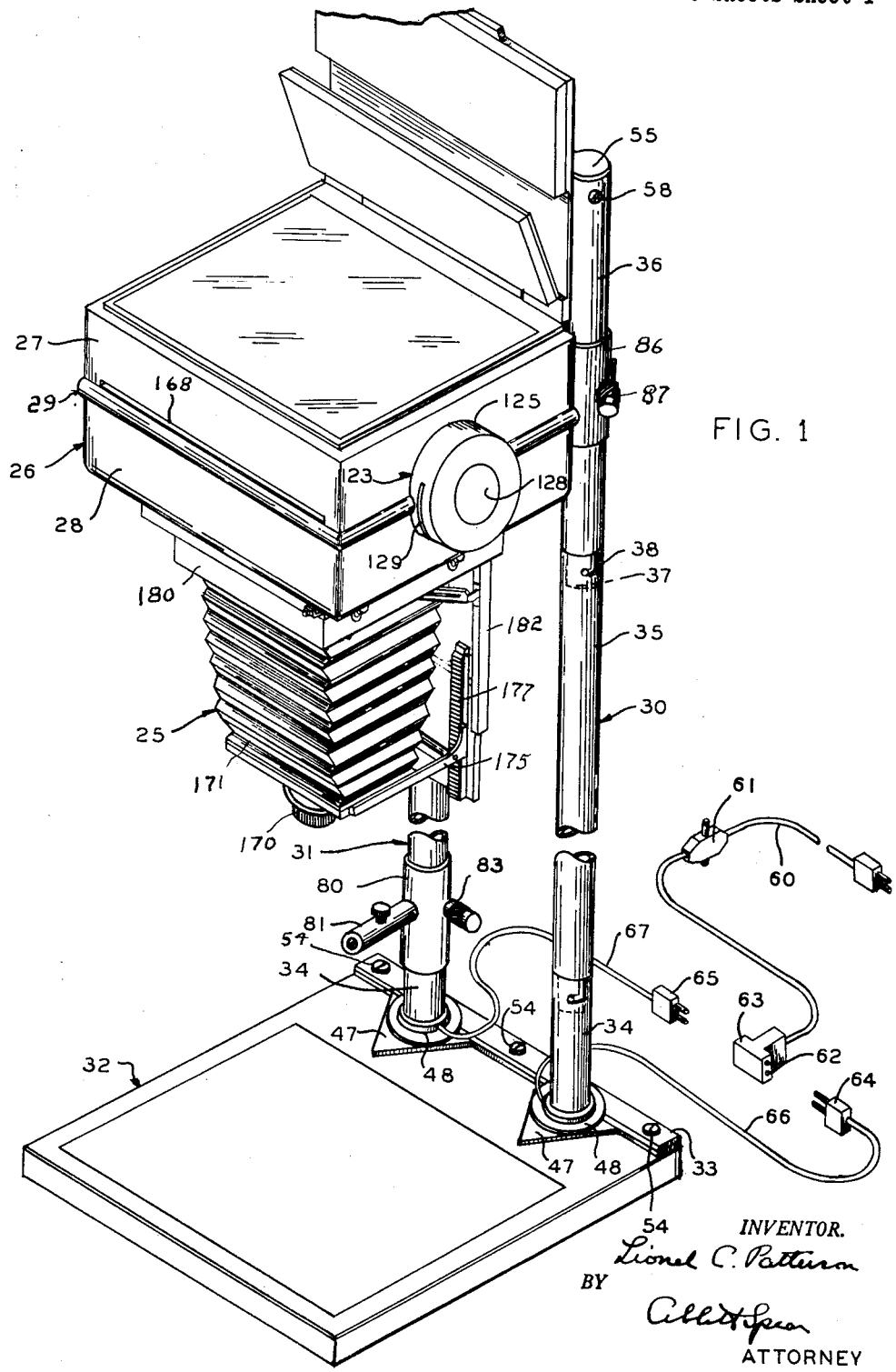
FIG. 1 is a view, in perspective, of the apparatus assembled for various dark room operations.
Figure 2:
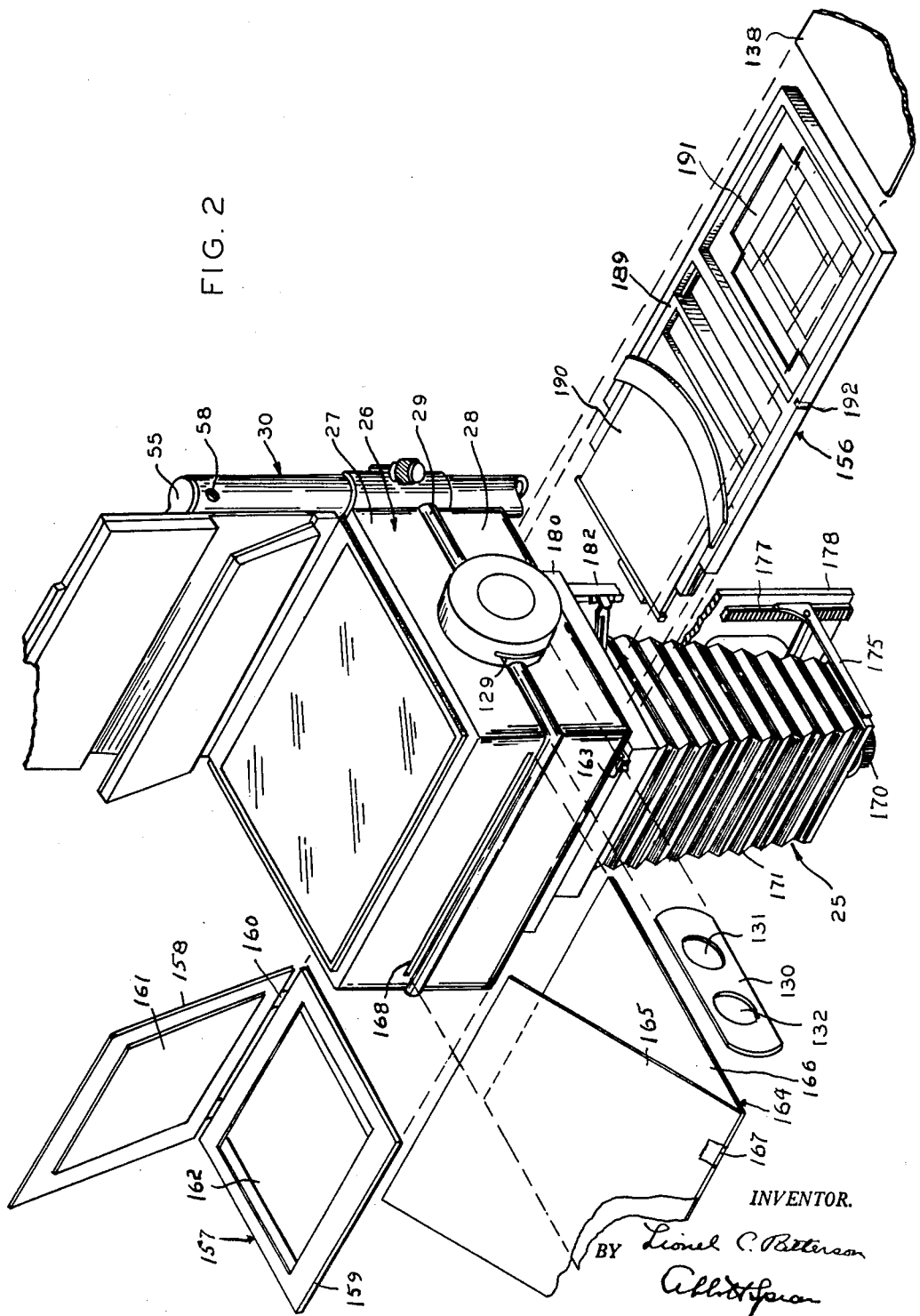
FIG. 2 is a fragmentary perspective view on an enlarged scale, with certain of the parts removed to show their details.

In order that the invention may be most readily understood, a camera, generally indicated at 25, is shown in FIGS. 1 and 2 attached to a housing 26 comprising an upper reflector 27, a lower reflector 28, and an intermediate frame 29 of stock of T-shaped section. Standards, generally indicated at 30 and 31, are unified by the false base 32 and the locking bar 33.

The column of each standard is, for convenience in portage and storage, formed from tubular sections 34, 35, and 36. While these may be joined in any manner, the lower end of each of the sections 35 and 36 is shown as having an extension 37 entrant of the proximate end of the subjacent section and detachably joined thereto as by a bayonet type of joint 38, see FIGS. 1 and 3.

Each standard, as may be seen in FIG. 3, is shown as having three parallel-sided legs 39, 40 and 41, each of the same width and with its front end rounded. Each middle leg 40 is longer than its companion legs 39 and 41 and has a rearwardly dependent point 42 whose sides are equal in length to the leg width, thus defining an equilateral triangle whose center is indicated at 43, see FIGS. 9 and 10. The corresponding end of each leg 39, 41 is "square cut" and said legs are connected to the leg 40 as by hinges suggested at 44 in FIG. 3, enabling the legs to be spread at an angle of 120° with respect to each other with the ends of the legs 39 and 41 then abutting the sides of the point 42, as suggested by the dotted line position of the legs of the standard 30 in FIG. 3.

A disc 45 is secured to the under surface of each leg 40 with its center in vertical alinement with the triangle center 43. To the upper surface of each leg 40, there is secured a part in the form of an equilateral triangle 46 with its center also in vertical alinement with the center 43 and with one apex in registry with the center line of the leg 40. The disc 45 and the triangular part 46 reinforce the hingedly interconnected ends of the legs when disposed in supporting position. The part 46 is flanged to provide a second, slightly larger, triangle 47 which has a central mount 48 to which the lowermost section 34 of a column is secured.

The false base 32, see FIG. 3, may comprise a plate 49 positioned by the sides 50 to overlie the legs of both standards when they are folded together. At its rear edge, the plate 49 has notches 51, each dimensioned to receive one of the triangles 46 and to extend therebeyond thus to sandwich the plate 49 between the legs of the standards and the triangles 47. The rear edge of the plate 49 is built up as at 52 and 53 to provide surfaces in the plane of the upper surface of the triangles 47 and these are shaped to complement the rear parts thereof. The locking bar 33 fits over the rear parts of the triangles 47 and the rear edges of the plate 49 to which it is anchored as by screws 54 thus to permit convenient means for locking the standards together with their legs concealed by the false base 32.

The upper ends of the columns are interconnected as by a bar 55 provided with a handle 56 and extensions 57 disposed and dimensioned to enter the upper ends of the column sections 36 and to be locked thereto as by set screws 58. The electric circuits to the reflectors 27 and 28 are shown as including an extension cord 60 provided with a master switch 61 and double sockets 62 and 63 for the plugs 64 and 65 of the leads 66 and 67, respectively. In practice, the prongs 68 and 69 of the plugs 64 and 65 are dimensioned to enable them to be inserted into either socket 62 or 63 but not reversed therein.

Figure 16:
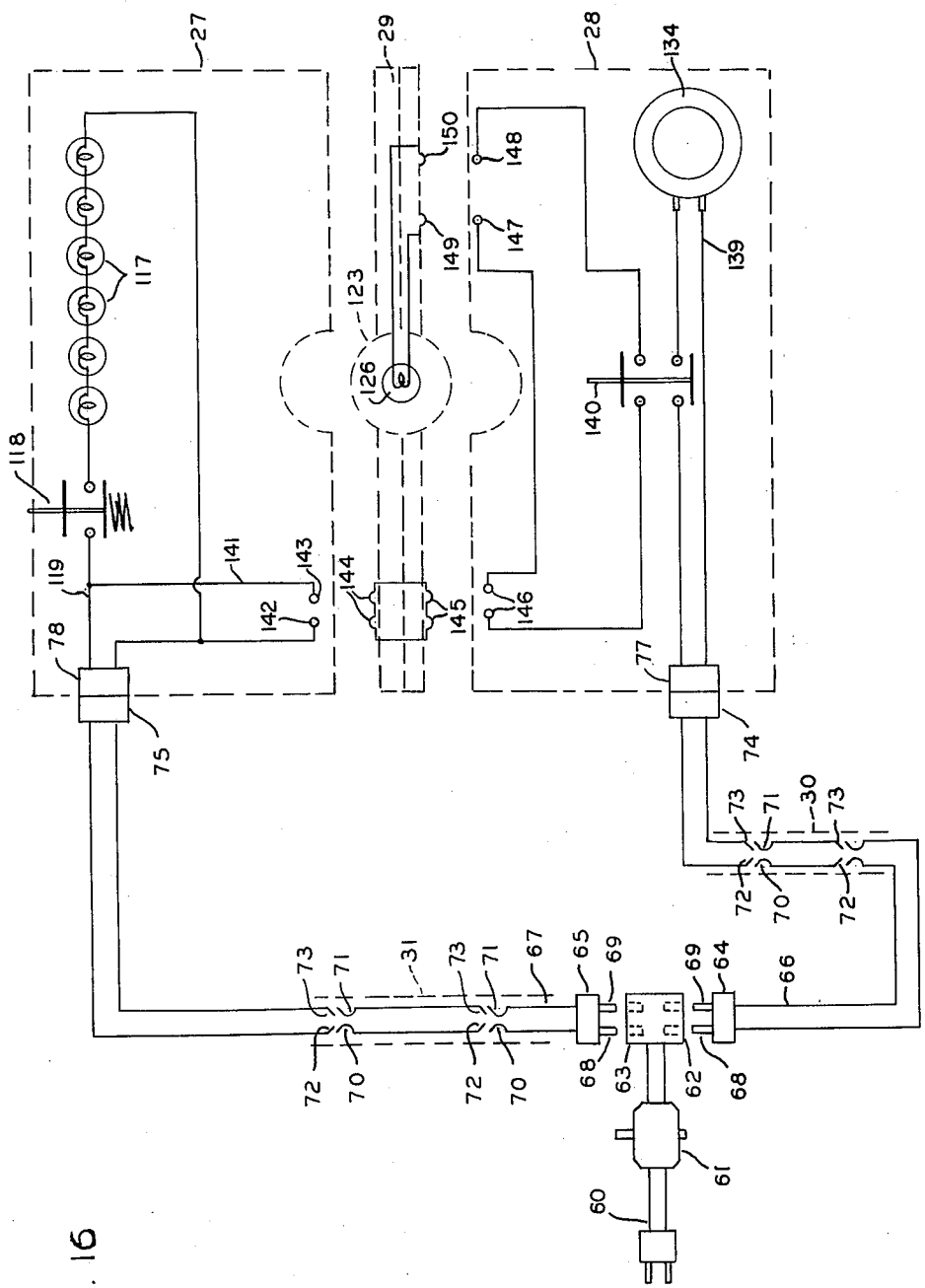
FIG. 16 is a schematic view of the operating circuits.

Each of the leads, 66, 67 enters its column through its support 48 and includes in the upper end of its sections 34 and 35 pairs of spring contacts 70 and 71 engageable by the contacts 72 and 73 carried by the proximate end of the next sections 35, 36 when the sections are united. Each lead extends from the upper end of its column and includes plugs, that for the lead 66 being indicated at 74 and the plug for the lead 67 being indicated at 75. The lead 66 is shown as having a fluorescent ballast 76. The plug 74 is insertable into the socket 77 of the reflector 28, while the plug 75 enters a corresponding socket 78 of the reflector 27 which may be seen only in FIG. 16.

In order that the reflector 27 may be attached to the column of its standard 31, there is shown a sleeve-like holder 80 slidable on that column. The holder 80, which may be most clearly seen in FIG. 8, has a tubular arm 81 provided with a set screw 82 and a guideway 83 receiving a recessed plunger 84 urged by spring 85 into binding engagement with the column. The arm 81 and guideway 83 are disposed at right angles to each other. When the plunger 84 is pressed against its spring, the holder 80 may be slid upwardly or downwardly along its column into any desired position. A similar holder 86 (see FIG. 11) is slidable along the column of its standard 30 when its plunger 87 is advanced in its guideway 88 against the action of the locking spring 89 to disengage the recess of the plunger 87 from binding engagement with the column. It will be noted from FIG. 11 that the tubular arm 90 defines a right angle bend and is attached to the holder 86 at an angle of approximately 45° to the axis of the plunger guideway 88.

A mounting plate 91 (see FIG. 3) is fixed on the other extremity of the arm 90 with an opening 92 in communication with the interior of the arm 90 which serves to receive and support the pivot 93 carried by the reflector 28 (see FIG. 4). Turning of the pivot 93 is prevented as by the set screw 94. The member 28 is locked to the plate 91 as by screws not shown extending through screw holes 95.

The reflector 27 has a pivot 96 for entry into the exposed end of the tubular arm 81 to which it may be locked as by the set screw 82. The plate 91 has a notch 97 accommodating the pivot 96 and screw holes 98 enabling the reflector 27 to be secured to the plate 91. When the reflectors 27 and 28 are thus secured to the plate 91, they define, in effect, with the frame 29 a unitary housing 26 connected to the standard 30, and it is preferred that it will not be removed therefrom, but, for storage, be slid downwardly to the short bottom section 34. It will be appreciated that the housing 26 may be raised, lowered, and swung around the column of the standard 30 and the reflector 28, alone on standard 30, may moreover be turned about an axis at right angles thereto established by the extremity of the arm 90. Like adjustments of the reflector 27 are possible when detached from the plate 91 and its pivot 96 is inserted into the arm 81 of the holder 80, carried by standard 31.

Referring now to the housing member 26, the reflector 27, the main reflector in studio work, has a hinged cover 100 providing a fixed platen section 101, see FIG. 4, and a spring platen section 102 each provided with a cushioned face, such as sponge rubber 103. The cover 100 has a pair of arms 104 interconnected by a rotatable handle 105 located to lie below the plane of the opal printer glass 106 when the cover is closed to bring its platen sections in contact with the printer glass. The printer glass is positioned in a seat 109 in a frame 110 adjacent the top of the reflector 27.

A catch 111 enables the cover 100 to be locked to the reflector 27 in light-tight relationship so that said reflector 27 normally opens only through its lower face. A frame comprising end members 112, see FIGS. 4 and 7, and connecting members 113 carries the shafts 114 provided with cranks 115 at each of their ends. One of the cranks 115 extends through the wall of the reflector 27 and is provided with a knob 116 to facilitate its turning, thus to raise and lower the frame and the six opal flame-type lamps 117 of which three are mounted on each of the frame members 112. For use of the reflector 27 as a main light source in studio work, the frame is in its raised position, while for contact printing, the frame is lowered to effect a more even distribution of the light over the opal printing glass 106. In this connection, means may be employed to enable the light intensity to be varied as is desirable with certain papers.

The reflector 27 has a two-way toggle switch 118 in the lead 119 to the lamps 117 from the socket 75. One position of the switch 118 is yieldably maintained ensuring that the lamps 117 will be lit only when the switch is held in that position as is required for contact printing. The switch will stay in the other position when the lamps are to provide light over a period longer than that required in contact printing.

Corresponding sides of the reflectors 27 and 28 have semi-circular recesses 120 and 121 in their proximate edges to define, when the parts are assembled, an aperture of the size and shape of the central part 122 of a generally indicated hollow, open-ended lamp housing 123 shown in FIGS. 4, 12 and 13 as having a circular flange 124 at its inner end and a circular chamber 125 at its outer end. A lamp 126 is located within the housing 123 whose inner end is closed by a red filter 127 and whose outer end is closed by the semi-spherical frosted shell 128. This lamp thus serves as a combined pilot and safe-light and the ends of the T-shaped frame 29 are connected to it with the head of the T serving as flanges overlying the proximate ends of the reflectors 27 and 28 as a light-tight seal. The chamber 125 has transversely alined slits 129 for the slide 130 having a red filter 131 and a green filter 132.

The bottom of the reflector 28 has a circular port 133 smaller in diameter than the fluorescent lamp 134 and located to block from the camera lens direct rays of light therefrom. Attached to the bottom of reflector 28 are flanges 135 of a spring plate 136 having a circular port 137 shown as of the same diameter as the port 133 and defining with the proximate face of the reflector 28 a slideway frictionally retaining the shutter 138 in light sealing relationship thereto.

The fluorescent lamp 134 and its starter, not shown, are in the lead 139 from the socket 77. The lead 139 also is controlled by the two-way toggle switch 140 in one of its two positions in either of which it remains set. In the other position of the toggle switch 140, the lamp 126 is controlled.

The circuit 141 to the lamp 126 is a branch of the circuit 119 of the reflector 27 and includes the toggle switch 140 in the other of its positions, contacts 142 and 143 carried by the reflector 27, spring contacts 144 and 145 carried by the frame 29 and contacts 146 on the reflector 28. The reflector 28 also carries contacts 147 and 148 engageable by spring contacts 149 and 150 on the frame 29. This enables a third switch to be avoided and maintains the separability of the housing 26 into two reflectors.

When the housing is assembled as shown in FIG. 1 and the opal lamps 117 are in their lowermost position, switching on the lamp 126 illuminates the printing glass 106 with a weak red light from its red filter 127 to provide a pilot light for contact printing. Light through the shell 128 provides a suitable working light and by inserting the slide 130 to bring either its red filter 131 or its green filter 132 into filtering position, the light from shell 128 is either a red or a green safelight with the green filter serving approximately as a blank-off shutter.

The plate 136 is also provided with a pair of parallel, opposed U-shaped channels 151, one having a lock 152. It will be noted from FIG. 5 that the back of the camera 25 has a frame 153 provided with members 154 providing ribs entrant of the channels 151 and themselves being channeled as at 155 to receive the chassis and focussing screen generally indicated at 156 or a negative carrier generally indicated at 157 and shown as comprising frames 158 and 159 hinged together at 160 with the frame 158 carrying a sheet of opal glass 161 and the frame 159 carrying a sheet of clear glass 162. Preferably, the position of the carrier 156 is established by the slidable stop 163.

A generally indicated copy board 164 has clear glass sheets 165 and 166 hinged together as at 167 dimensioned to enter the housing part 27 through its slot 168 to be supported in channels 169 fixed in the reflector 27. As the location of the board 164 is further from the lens 170 of the camera 25 than is the carrier 157, the focussing range must include the position of the board 164. In order that the bellows 171 may be fully contracted by means of the knob 172, the lens plate 173 is shown in FIG. 5 as having a shaft 174 carried by its arms 175. The shaft 174 carries the knob 172 and pinions 176 meshing with their respective racks 177 carried by and extending beyond the upper edge of the plate 178. The racks 177 and rack sections 179 carried by the camera body 180 are shown as having their proximate ends beveled as they mate when the plate 178 is slid fully back in the grooves 181 in the camera door 182. The body 180 has a slot 183 to receive the shaft 174 when its pinions 176 are in mesh with the rack extensions 179. The racks 177 and their extensions 179 slidably support the extremities of the plate arms 175.

The door 182 is conventionally hinged to the body 180 to which it is braced, when open, by the releasable arm 184 and by the block 185 which also serves to house the beveled extremities of the racks 177. A rotatable adjustor 186 carried by the plate 178 has its screw portion 187 threaded through the receiver 188 in the door 182 thus to enable the plate to be adjusted relative thereto.

The carrier 156, see FIG. 2, slidably supports the double-sided chassis 189 shown with one of its two sliding doors 190 drawn partly out. The carrier 156 is also provided with a ground glass focussing screen 191 and has a notch 192 to receive the catch 163 when it is correctly located with respect to the camera.

The apparatus assembled as shown in FIG. 1 constitutes a vertical enlarger and its uses as such will be first discussed.

A transparent negative is placed in the film carrier 157 which is placed, with its opal glass uppermost, in the supporting slideway defined by the channels 155 and the proximate surface of the plate 136. The knob 116 may then be turned to lower the opal lamps 117 away from the printer glass 106 and towards the negative in the film carrier 157 if strong light is desired. The switch 118 is then closed in the position in which it remains set. Light from the lamps 117 is diffused by the opal glass 161 of the carrier 159 and passes through the negative and is projected by the lens 170 onto photographic paper on the false base 32 or placed in an easel, not shown, positioned thereon. When the paper is developed, a positive print is obtained. The fluorescent light source 134 may be used at the same time if increased illumination is desired or by itself if softer effects are wanted. The housing 26 and camera 25 may be raised or lowered, as a unit, along the standard 30 to increase or decrease the area of the projections. Focussing for enlarging is done by means of the knob 172 while for reducing purposes the adjuster 186 is also used.

Copying may also be done with the apparatus of FIG. 1 as by placing that which is to be copied, a picture, for example, face downwards in the copyboard or holder 164. With the board then positioned to the slideway defined by the slot 168, the switch 140 is then positioned to close the lead 139 to the fluorescent lamp 134. Light is thus reflected from the face of the picture downwardly through the lens 170 onto the photographic paper to print a negative print. By repeating the process with that print, a positive can be obtained and it will be apparent that the picture may be easily reduced to provide a small negative print which may be as easily enlarged as required thus making it possible to economize in the use of photographic paper.

Copying may also be done by using the apparatus of FIG. 1 as a vertical camera. In that case, that which is to be copied is placed face upwards on the false base 32 and film is placed in the chassis 189 which is slid into the carrier 156. The carrier 156 is slid into the slideway defined by the channels 155 and the appropriate sliding door 190 is pulled out to clear the film for exposure to the subject by means of the lens shutter, not shown. Focussing is done by means of adjustments relative to a predetermined position on the standard 30 and by extending the bellows to a predetermined position relative to the plate 178. In practice, for purposes of economy, photographic paper rather than film is used in the chassis 189 to obtain a negative print. Positives can then be made as has been described.

For use as a contact printer, the bellows 171 are fully contracted and the camera door 182 is closed. The unit is then lowered to be supported by the false base 32. With the knob 116 turned to bring the opal lamps 117 in their lower position, switch 140 is positioned to close the lead 141 to the pilot lamp 126. Negative film is placed on the glass 106 with sensitive paper over it. The cover 100 is then closed tightly and the switch 118 is held closed, against the action of its spring, to complete the circuit to the opal lamps 117 for the estimated exposure time.

By positioning the switch 140 to close the lead 141, a white working light is provided with respect to the exterior of the housing 26 by lamp 126. Because of the filter 127, lamp 126 is a pilot light with respect to the interior of the housing 26, and may be made a red or green safelight with respect to the exterior of the housing 26 by use of the slide 130.

When it is desired to use the camera 25 as such, it is detached from the housing 26 and usually set up on a tripod, not shown. The reflectors 27 and 28 are removed from the frame 29 and with the tie-bar 55 detached and the false base 32 separated from the lock bar 33, the standards are ready for separate use once their legs are suitably spread. The reflector 27 is, of course, mounted on the standard 31 through the use of the holder 80.

From the foregoing, it will be apparent that apparatus in accordance with the invention is well adapted to serve a number of photographic purposes making it possible to combine economy both in cost and in space requirements with quality.

What I therefore claim and desire to secure by Letters Patent is:

1. In photographic apparatus, a camera, first and second units each constituting a reflector and including a light source, said units being detachably joined to provide a light-tight housing, said camera being detachably joined to the second unit with its interior exposed, to be illuminated by the light source of either unit, said camera including film receiving means, and said first unit including copy board receiving means and film receiving means located on opposite sides of its light source with the copy board receiving means being proximate to said second unit.

2. In photographic apparatus, a camera, first and second units each constituting a reflector and including a light source, said units being detachably joined to provide a light-tight housing, said camera being detachably joined to the second unit with its interior exposed to be illuminated by the light source of either unit, said camera including film receiving means, and said first unit including copy board receiving means and film receiving means located on opposite sides of its light source with the copy board receiving means being proximate to said second unit, a pair of standards each including a mount, one mount being for holding said second unit by itself and said housing and the other mount being for holding said first unit by itself, and base structure detachably holding said standards together as a unit.

3. In photographic apparatus, a camera, first and second units each constituting a reflector and including a light source, said units being detachably joined to provide a light-tight housing, said camera being detachably joined to the second unit with its interior exposed to be illuminated by the light source of either reflector, said camera including film receiving means, and said first unit including copy board receiving means and film receiving means located on opposite sides of its light source with the copy board receiving means being proximate to said second unit, a pair of standards each including a unit holding mount and three supporting feet hinged to swing from a position of storage into a position of use in which they are angularly disposed relative to each other, and detachable base structure covering said feet in their position of storage and locking said standards to said structure.

4. The apparatus of claim 3 in which each standard includes an element and the base structure includes a false cover and a locking bar attachable thereto, said element and said bar provided with portions engageable with said standard elements.

5. In photographic apparatus, a camera, first and second units each constituting a reflector and including a light source, said units being detachably joined to provide a light-tight housing, said camera being detachably joined to the second unit with its interior exposed to be illuminated by the light source of either unit, said camera including film receiving means, and said first unit including copy board receiving means and film receiving means located on opposite sides of its light source with the copy board receiving means being proximate to said second unit, the light source of the first unit being adjustable towards and away from its film receiving means.

6. The apparatus of claim 5 in which the light source of the first unit is a plurality of lamps, and there is a frame for said lamps including supporting cranks rotatably carried by the first unit to position said frame transversely thereof, and the end of one of said cranks being exposed exteriorly of the unit and including a knob thus to enable the elements to be moved together towards or away from the ends of the unit.

7. In photographic apparatus, a camera, first and second units each constituting a reflector and including a light source, said units being detachably joined to provide a light-tight housing, said camera being detachably joined to the second unit with its interior exposed to be illuminated by the light source of either unit, said units, when detached from each other and from said camera, being usable by themselves, said camera including film receiving means, and said first unit including copy board receiving means and film receiving means located on opposite sides of its light source with the copy board receiving means being proximate to said second unit, the light source of the first unit being opal and the light source of the second unit being a fluorescent lamp.

8. In photographic apparatus, a camera, first and second light units each constituting a reflector and including a light source, a frame including a pilot light, said units being detachably joined to said frame to provide a light-tight housing, said camera being detachably joined to the second unit with its interior exposed to be illuminated by the light source of either unit, said units, when detached from each other and from said camera, being usable by themselves, said camera including film receiving means, and said first unit including a copy board receiving means and film receiving means located on opposite sides of its light source with the copy board receiving means being proximate to said second unit, the light source of said frame being a pilot light with respect to the interior of said housing, and a working light with respect to the exterior of said housing, and means to convert said working light to a safe light.

9. The apparatus of claim 8 in which there is a separate circuit to the light source of each unit and the circuit to the first unit includes a lead to the pilot light, portions of the lead being carried by the units and the frame and provided with spring contacts for connecting the portions on assembly of the housing.

10. In photographic apparatus, a camera, first and second light units each constituting a reflector and including a light source, said units being detachably joined to provide a light-tight housing, a circuit to each light source, each circuit including a switch, the switch for the circuit for the first unit having an inoperative position and two positions in which its circuit is closed, said switch in one of said closed positions being resiliently urged towards said inoperative position, said camera being detachably joined to the second unit with its interior exposed to be illuminated by the light source of either unit, said units, when detached from each other and from said camera, being usable by themselves, said camera including film receiving means, and said first unit including copy board receiving means and film receiving means located on opposite sides of its light source with the copy board receiving means being proximate to said second unit.

11. In photographic apparatus, a camera, first and second light units each constituting a reflector and including a light source, a frame detachably joining said units to provide a light-tight housing, a pilot lamp carried by said frame and provided with a lead, a circuit to each light source, each circuit including a switch, the switch for the circuit for the first unit having an inoperative position and two positions in which its circuit is closed, said switch in one of said closed positions being resiliently urged towards said inoperative position, the switch for the circuit for the second unit having an inoperative position and two positions in which its circuits are closed, one of the circuits of said switch of said second unit being in the lead of the circuit for said first unit and serving to close the pilot lamp circuit, said camera being detachably joined to the second unit with its interior exposed to be illuminated by the light source of either unit, said units, when detached from each other and from said camera, being usable by themselves, said camera including film receiving means, and said first unit including copy board receiving means and film receiving means located on opposite sides of its light source with the copy board receiving means being proximate to said second unit.

12. In photographic apparatus, a camera, first and second light units each constituting a reflector and including a light source, means detachably joining said units to provide a light-tight housing, complemental interlocking portions carried by said second unit and said camera to expose the interior of said camera to light from either of said sources, the portions carried by said second unit including a removable shutter, and said portions of said camera including film receiving means, and said first unit including copy board receiving means and film receiving means located on opposite sides of its light source with the copy board receiving means being proximate to said second unit.

13. In photographic apparatus, a camera including a frame provided with rack portions, a door hinged to said frame, a plate slidably connected to said door and provided with rack portions, a threaded connection between said plate and said door for effecting sliding movement between extended and retracted positions, proximate ends of the rack portions of said frame and plate abutting in said retracted position, a lens plate slidable along said rack portions and including manually rotatable rack-engaging pinions, a bellows carried by said frame and connected to said lens plate, first and second light units each constituting a reflector and including a light source, said units being detachably joined to provide a light-tight housing, said camera frame being detachably joined to the second unit with its interior exposed to be illuminated by the light source of either unit, said camera including film receiving means, and said first unit including copy board receiving means and film receiving means located on opposite sides of its light source with the copy board receiving means being proximate to said second unit.

References Cited in the file of this patent

UNITED STATES PATENTS

| | | |
|---|---|---|
| 744,024 | Brehm | Nov. 17, 1903 |
| 1,572,899 | Mastrukoff | Feb. 16, 1926 |
| 1,748,523 | Smith | Feb. 25, 1930 |
| 1,932,701 | Kurze | Oct. 31, 1933 |
| 2,003,190 | Hineline | May 8, 1935 |
| 2,254,125 | Tarullo | Aug. 26, 1941 |
| 2,324,842 | Huebner | July 20, 1943 |
| 2,369,897 | Hjort | Feb. 20, 1945 |
| 2,415,635 | Hopkins | Feb. 11, 1947 |
| 2,564,303 | Graham | Aug. 14, 1951 |